United States Patent [19]

Navarro

[11] 4,248,175
[45] Feb. 3, 1981

[54] AUTOMATIC DOG OR CAT FEEDER

[76] Inventor: Jesus Navarro, 911 E. 39th Pl., Hialeah, Fla. 33013

[21] Appl. No.: 94,219

[22] Filed: Nov. 14, 1979

[51] Int. Cl.³ .............................................. A01K 5/02
[52] U.S. Cl. ................................................. 119/51.12
[58] Field of Search .............. 119/51.11, 51.12, 51.13; 222/367, 368, 370

[56] References Cited

U.S. PATENT DOCUMENTS

| | | | |
|---|---|---|---|
| 2,500,243 | 3/1950 | Dixon | 119/51.13 |
| 2,528,742 | 11/1950 | Coffing | 119/51.5 X |
| 3,050,029 | 8/1962 | Appleton | 119/51.13 |
| 3,468,291 | 9/1969 | Allen | 119/51.12 |
| 3,946,702 | 3/1976 | Mazzini | 119/51.13 |

Primary Examiner—Robert Peshock
Assistant Examiner—Robert P. Swiatek
Attorney, Agent, or Firm—Ernest H. Schmidt

[57] ABSTRACT

An automatic dog or cat feeder has a plurality of pairs of water and food bowls in a horizontally rotative tray, and a cover assembly for the rotative tray and having a front opening exposing only one pair at a time of the food and water bowls. The cover assembly contains a clock controlled drive mechanism for stepwisely turning the rotative tray member so that one pair of its pre-filled food and water bowls is exposed at the cover assembly front opening during each successive day during the automatic feeding of a house pet.

8 Claims, 6 Drawing Figures

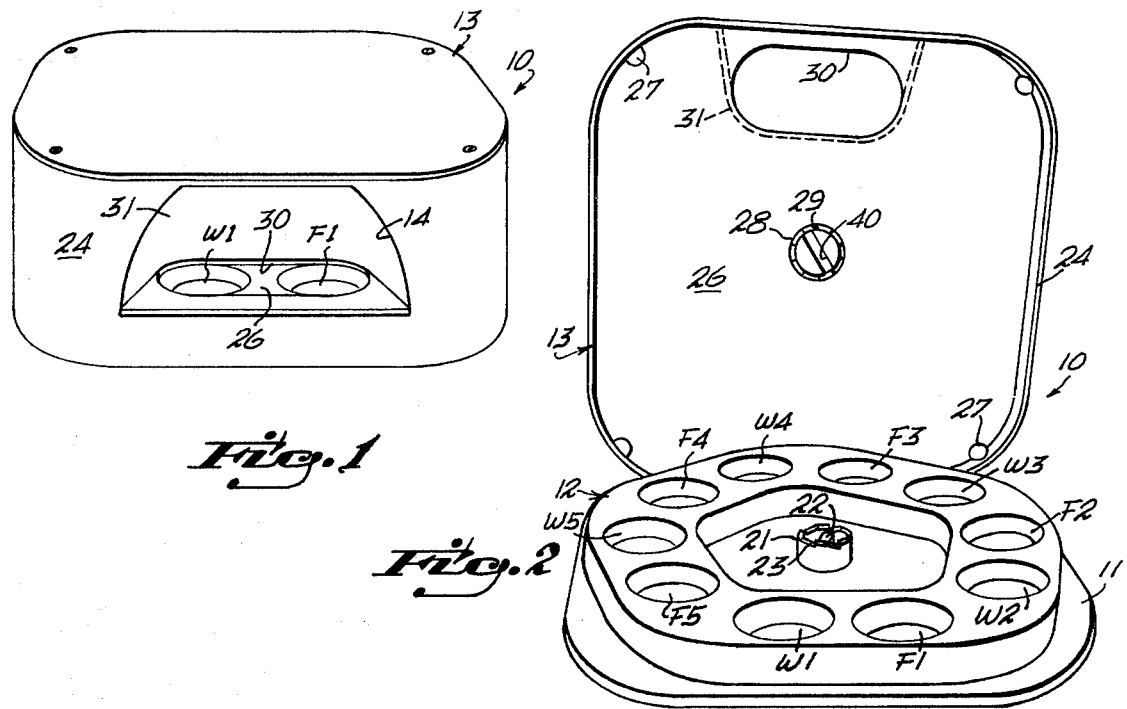
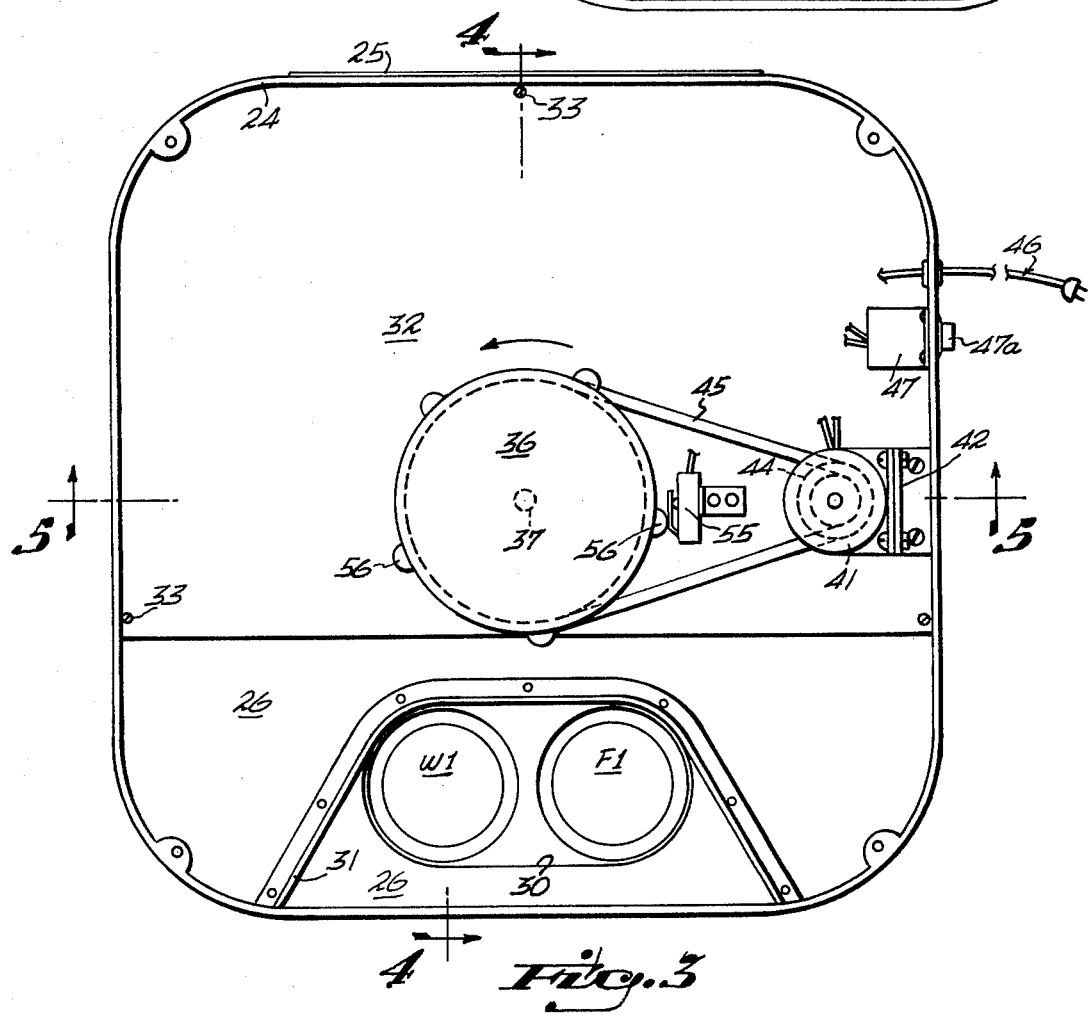

AUTOMATIC DOG OR CAT FEEDER

My invention relates to automatic feeding devices and is directed particularly to a device for automatically exposing, on successive days as controlled by a clock, pairs of pre-filled water and food bowls for use in feeding dogs or cats at a predetermined time for a plurality of successive days.

Various kinds of automatic food and water feeding devices for house pets, such as cats and dogs, have heretofore been devised. Most of these utilize enclosed hoppers storing food and water, daily quantities of each of which are released by time controlled mechanism for gravity feed into exposed food and water bowls for access by the pet. Such automatic feeders are not only complicated in structure, but are also lacking in sanitation for the reason that the same bowls are used from day to day so that old food and water not completely consumed are mixed with the new feedings being supplied on successive days. It is, accordingly, the principal objective of this invention to provide a novel and improved portable house pet feeding device comprising a plurality of pairs of pre-filled water and food bowls, and wherein the bowl pairs are automatically changed at the feeding station or access opening on a daily basis, thereby eliminating any possibility of contamination of the new food and water feeding with food and water remaining from the previous day.

It is a still further object of the present invention to provide a portable pet feeder of the character described which may be economically constructed as well as being dependable in operation.

Other objects, features and advantages of the invention will be apparent from the following description when read with reference to the accompanying drawings. In the drawings, wherein like reference numerals denote corresponding parts throughout the several views:

FIG. 1 is a front perspective view of a preferred form of a portable, automatic dog or cat feeder embodying the invention;

FIG. 2 is the front perspective view, as in FIG. 1, but with a cover assembly open as when filling the individual multiple food and water bowls of the rotative feed tray;

FIG. 3 is a top plan view of the automatic feeder, on an enlarged scale and with the top cover removed to reveal constuctional details of the automatic drive mechanism;

Figure 4:
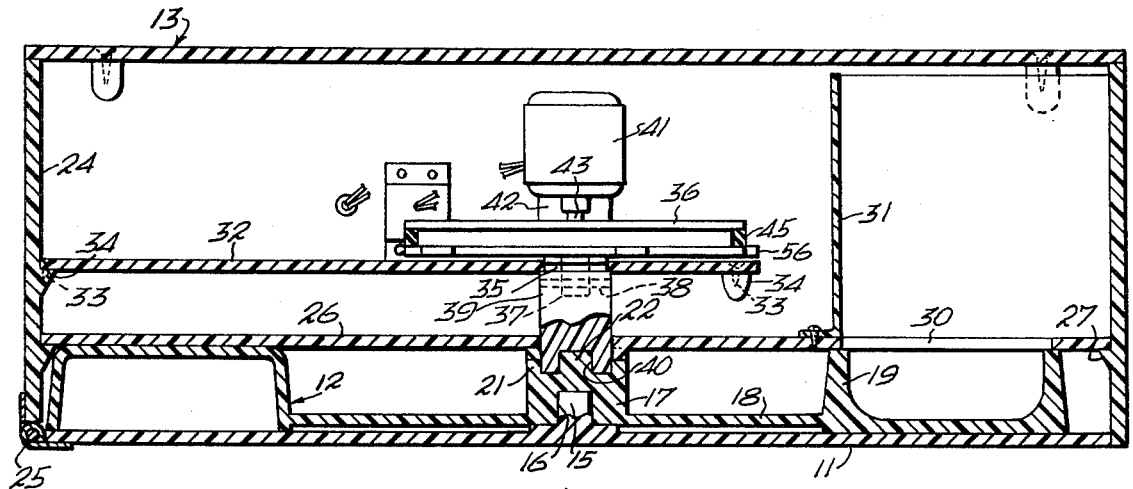
FIG. 4 is a vertical cross-sectional view taken along the line 4—4 of FIG. 3 in the direction of the arrows.

Referring now in detail to the drawings, reference numeral 10 in FIGS. 1 and 2 designates, generally, a preferred form of portable, automatic dog or cat feeder embodying the invention, the same comprising a flat base member 11, a multiple bowl tray member 12 supported by said base member and rotatively journalled with respect thereto, and a cover assembly 13 hinged with respect to said base member along one side for opening and closing over said tray member in the manner and for the purpose hereinafter described. The base member 11, tray member 12 and the closure wall portions of the cover assembly 13 may conveniently be fabricated of synthetic plastic materials for economy of manufacture and durability in use. The tray member 12 will preferably be integrally vacuum molded with rounded corners to facilitate cleaning. As illustrated in FIG. 1, the automatic feeder is of generally rectangular or square shape with rounded vertical corners.

As further illustrated in FIG. 1, the cover assembly 13 is provided with a front opening 14 of such size as to expose one pair at a time of a plurality of pairs of water and food bowls, W-1, F-1, W-2, F-2; W-3, F-3; W-4, F-4; and W-5, F-5 (see FIG. 2). As is hereinafter described in detail, the cover assembly 13 includes mechanism for stepwisely turning the tray member 12 so that one pair of the water and food bowls, W-1, F-1 through W-5, F-5, will be periodically exposed for use by the dog or cat to be fed. Ordinarily, stepwise advancement of the food and water tray bowls will occur once a day, at the pet's regular feeding time. It will thus be evident that in the embodiment illustrated, five consecutive days of automatic feeding of food and water is provided for.

Figure 5:
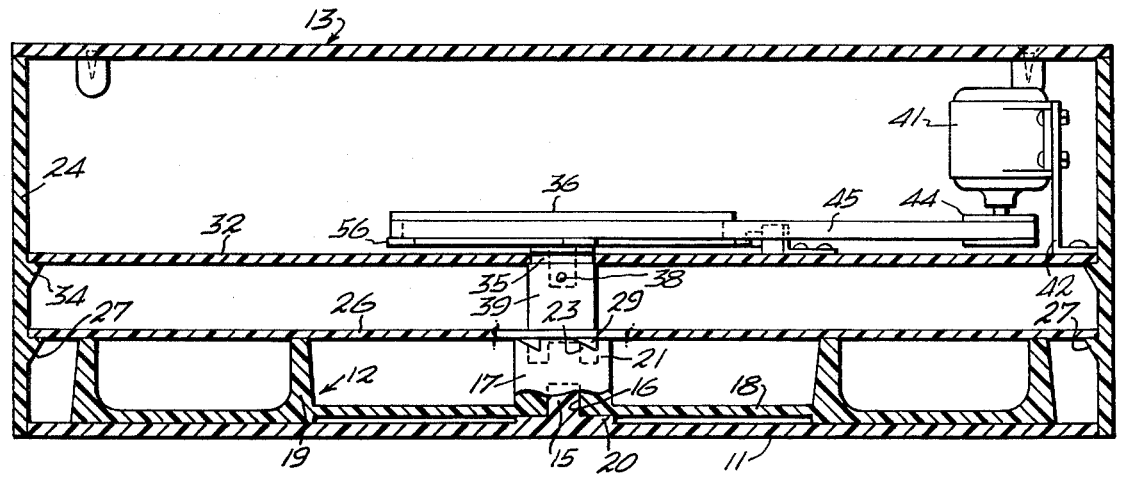
FIG. 5 is a vertical cross-sectional view taken along the line 5—5 of FIG. 3 in the direction of the arrows.

As means for rotatively journalling the tray member 12 upon the flat base member 11, said base member is integrally formed with a short, upstanding, central journal post 15 receivable within a cylindrical recess 16 provided within the underside of a central, upstanding hub portion 17 of said tray member. As best illustrated in FIG. 2, the tray member 12 is of generally pentagonal form, with rounded corners, with water and food bowl pairs, W-1, F-1, etc. being formed within each of the five sides. As illustrated in FIGS. 4 and 5, a central web portion 18 of the tray member 12 extends from the hub portion 17 to the pentagonal bowl ring 19, said web portion being slightly vertically spaced from the flat undersurface of said bowl ring. As further illustrated in FIGS. 4 and 5, base member 11 has an increased diameter flange portion 20 formed at the base of upstanding journal post 15, defining an annular shoulder against which the underside of tray member hub portion 17 rests.

Means is provided for releaseably coupling the hub portion 17 of the tray member 12 with drive means within the cover assembly 13, hereinbelow described. To this end, the hub portion 17 of the tray member 12 is integrally formed with an upwardly-extending sleeve portion 21 and a diametrically extending coupling bar 22 of rectangular cross-sectional shape. As best illustrated in FIG. 2, the upwardly-extending sleeve portion 21 is cut about its periphery with a plurality of saw-tooth notches 23, five in the embodiment illustrated, there being one for each of the bowl pairs W-1, F-1, etc., for the purpose hereinafter explained.

The cover assembly comprises a substantially square peripheral side wall 24, having rounded corners, conforming with the shape of base member 11 and having a slightly larger peripheral size so as to fit closely over the peripheral edge of the base member 11 when placed thereover as illustrated in FIGS. 1, 4 and 5. A piano hinge 25 joins base member 11 to the back vertical wall portion of peripheral side wall 24 to provide for opening and closing of the cover assembly with respect to said base member, as described above and illustrated in FIGS. 1 and 2.

As illustrated in FIGS. 2, 3, 4 and 5, a flat tray member cover plate 26 is loosely held within the cover assembly 13, being supported at marginal peripheral underside portions by a plurality of abutment ledge members 27 (see FIGS. 2 and 4) formed within the interior of the side wall 24 of the cover assembly. The abutment ledge members 27 are so located as to permit the tray member cover plate 26 to rest flat upon upper surface portions of the pentagonal bowl ring 19 of tray member 12 when the feeder is closed, thereby substantially sealing off the food and water bowls not being used, as is hereinafter more particularly described.

Means is provided for lifting the tray member cover plate 26 slightly as the tray member 12 is rotatively moved to its next successive position of use in feeding, for the purpose of reducing frictional drag on the drive mechanism. To this end, as illustrated in FIGS. 2, 4 and 5, the tray member cover plate 26 is provided with a central opening extending downwardly from which is a sleeve member 28 terminating in peripheral saw-tooth notches 29 complemental and engageable with saw-tooth notches 23 in upwardly-extending sleeve portion 21 of tray member 12. When the tray member 12 is in a position of use, such that any one of the bowl pairs W-1, F-1 through W-5, F-5 is in proper position for feeding, as illustrated in FIGS. 1 and 3, the saw-tooth notches 29 of sleeve 28 will be in full seating engagement with the saw-tooth notches 23 of tray member sleeve portion 21, and the tray member cover plate 26 will rest flat upon upper surface portions of the pentagonal bowl ring, as described above, thereby sealing off the bowls of water and food not exposed for feeding through the front opening 14 of the cover assembly 13. In this connection, it is to be noted, as illustrated in FIGS. 1, 2 and 3, that the tray member cover plate 26 is provided with a front opening 30 of such size as permits access to the food and water bowl pair being used for feeding. When the hub portion 17 of the tray member 12 is stepwisely rotated, by mechanism hereinbelow described, the turning of saw-tooth notched sleeve portion 21 of said tray member against saw-teeth 29 of sleeve 28 serves to lift tray member cover plate 26 during that interval in which the tray member is moved to its next sequential position of use, at which time the companion notches will fall into full inter-engagement with the tray member cover plate 26 in sealing engagement against the upper ends of the bowls not being used.

As best illustrated in FIGS. 1, 2, 3 and 4, the tray member cover plate 26 carries an upstanding partition wall 31 surrounding the rear edge of its front opening 30 and extending forwardly at each side to meet the front of cover assembly side wall 24 inside the front opening 14. The principal purpose of partition wall 31 is to prevent the crawling of small pets into the interior of the cover assembly 13 housing the drive mechanism.

As means for stepwisely rotatively driving the tray member 12, the interior of cover assembly 13 also has supported therein, in spaced relation with respect to tray member cover plate 26, a flat, rectangular, drive mechanism support plate 32, said support plate being attached, as by screws 33, to a plurality of abutment lugs 34 extending inwardly from interior side wall portions of the cover assembly side wall 24. As best illustrated in FIG. 3, the drive mechanism support plate 32 extends short of the upstanding partition wall 31 of tray member cover plate 26 so as not to interfere therewith. A central thrust bearing 35 mounted within a central opening in the support plate 32 supports a pulley 36 having a stub shaft 37 journalled in said thrust bearing and extending through the underside thereof. Secured to the outer end of the stub shaft 37, as by shear pin 38, is a cylindrical coupling member 39 the outer end of which is formed with a diametrically-extending recess 40 of rectangular cross-sectional shape. The size and shape of the coupling member 39 is such that, when the cover assembly 13 is closed as illustrated in FIGS. 1, 4 and 5, it will fit within the upwardly-extending sleeve portion 21 of tray member 12 for interengagement with coupling bar 22. It will be understood that in order to establish such inter-coupling, the tray member can be rotated by hand to achieve interfitting alignment of the coupling bar 22 with respect to diametrically extending recess 40.

As best illustrated in FIGS. 3 and 5, an electric drive motor 41 supported as by bracket 42 with respect to the upper surface of support plate 32, at one side thereof, has a vertically-extending drive shaft 43 carrying a drive pulley 44. The motor drive pulley 44 is mechanically connected with the pulley 36 by pulley belt 45.

Figure 6:
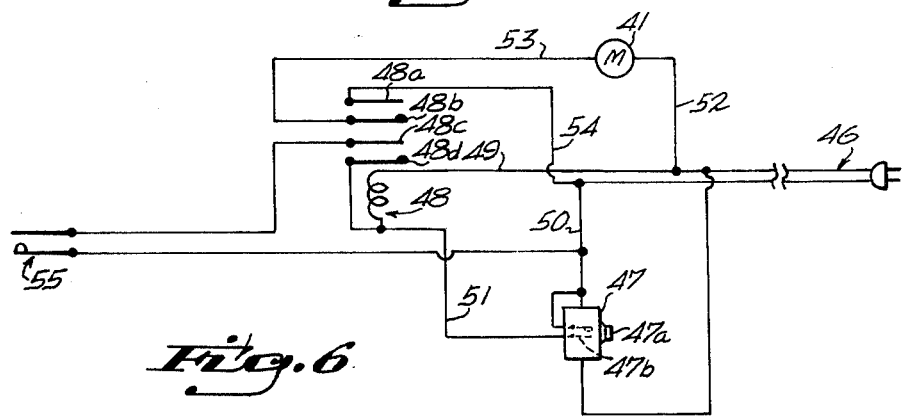
FIG. 6 is a schematic diagram of the electrical circuitary controlling the drive mechanism.

Time clock control means is provided for energizing the drive motor 41 so that the rotative tray member is turned through an arc of 72 circular degrees every 24 hours at a pre-determined time, thereby exposing a new pair of pre-filled food and water bowls each day for five days. To this end, a periodic energization circuit is provided for drive motor 41, illustrated schematically in FIG. 6. As illustrated in FIG. 6, energization current is supplied through household line cord 46 to switch 47b of clock 47 and control relay 48 connected in series through conductor 49, 50 and 51. The electric clock 47 has a control dial 47a which can be set to momentarily close circuit its electrical switch 47b at any approximate time within a 24-hour period. The control relay 48 has a pair of normally open single-pole, single-throw electrical switches 48a, 48b, and 48c, 48d, switch 48a, 48b of which is connected in series with drive motor 41 and the source of supply through conductors 52, 53 and 54. Relay switch 48c, 48d is a latching switch operative to temporarily retain control relay 48 in its energized condition after clock switch 47b has opened. For this purpose, switch 48c, 48d is connected across clock switch 47b in series with rotative tray member cam switch 55. Cam switch 55 is a normally closed single-pole, single-throw switch adapted to be open-circuited by any one of the five equidistantly spaced cam lobes 56 projecting radially outwardly of tray member pulley 36. Thus, between feedings, both the clock switch 47b and the cam switch 55 will open, the control relay 48 will be open-circuited, and relay switches 48a, 48b and 48c, 48d will open so that the drive motor 41 remains de-energized. When the clock switch 47b becomes momentarily closed at the pre-selected time during each 24 hour period, relay switches 48a, 48b and 48c, 48d will both close, thereby energizing drive motor 41 so as to turn tray member pulley 36. This causes the associated pulley cam lobe 56 to pass beyond the actuating member of cam switch 55, thereby to "latch" the relay in energized condition until said cam switch is again opened. This happens as soon as the next cam lobe comes into actuating position with respect to cam switch 55, at which time the relay will be returned to its de-energized state, thereby de-energizing drive motor 41 to await energization again upon the time clock having gone through its next 24 hour cycle of operation. It will be understood that the cam lobes 56 are so placed about the tray member 12 that its rotative movement stops automatically upon a new successive set of food and water bowls being brought into access position, as illustrated in FIGS. 1 and 3.

The principal advantages of my invention reside in its simplicity and the accessibility of the tray member with its integrally formed bowls. In this connection, it will be understood that the tray member 12 can readily be lifted off its journal post 15 for sanitary cleaning. The tray member cover plate, which normally rests flat upon the food and water bowls not being used and which serves to minimize spoilage and the entry of bugs and insects, is also easily cleaned and sanitized when the cover is opened as illustrated in FIG. 2.

While I have illustrated and described herein only one form in which the invention can conveniently be embodied, it is to be understood that this embodiment is presented by way of example only and not in a limiting sense. For example, while I have illustrated and described the rotary drive mechanism for the rotative food and water tray as being electrically controlled as energized by an ordinary source of AC voltage supply, it could as well be battery operated, or wind-up spring actuated, without departing from the invention. The invention, in brief, comprises all of the embodiments and modifications coming within the scope and spirit of the following claims.

What I claim as new and desire to secure by Letters Patent is:

1. An automatic dog or cat feeder comprising, in combination, a rotative tray member having a plurality of pairs of water and food bowls, said bowl pairs being equidistantly spaced about a peripheral marginal portion of said tray member, a tray member cover plate seatable upon said rotative tray member and having an opening serving to expose, one pair at a time, of said bowl pairs, and means for periodically rotating said rotative tray member with respect to said tray member cover plate so that the next rotatively successive pair of food and water bowls is brought into access position beneath said tray member cover plate opening, said means for periodically rotating said tray member comprising a substantially flat base member having an upstanding journal post, said tray member having a central hub portion recessed at its underside to removably seat upon said journal post for rotation with respect thereto, a cover assembly hingeably secured to said base member for movement between covering and uncovering positions with respect to said tray member, said tray member cover plate being supported within said cover assembly so as to normally rest flat against upper surface portions of said tray member bowl pairs when said cover assembly is in its covering relation with respect to said tray member.

2. An automatic dog or cat feeder as defined in claim 1 wherein said means for periodically rotating said rotative tray member further comprises a drive motor within said cover assembly, a rotary coupling member carried by said cover assembly and driven by said drive motor, said tray member having a central hub portion comprising mechanical coupling means engageable with said rotary coupling member when said cover assembly is brought into covering relation with respect to said rotative tray member.

3. An automatic cat or dog feeder as defined in claim 2 including means for lifting said cover plate from seating engagement upon said rotative tray member during the periodic rotation of said tray member with respect to said cover plate.

4. An automatic cat or dog feeder as defined in claim 2 wherein said mechanical coupling means comprises a diametrically-extending coupling bar within said tray member central hub portion and a complemental recess in said rotary coupling member.

5. An automatic cat or dog feeder as defined in claim 4 including means for lifting said cover plate from seating engagement upon said rotative tray member during the periodic rotation of said tray member with respect to said cover plate.

6. An automatic cat or dog feeder as defined in claim 5 wherein said cover plate lifting means comprises a cylindrical sleeve member fixed to said tray member cover plate and surrounding said rotary coupling member, said central hub portion of said tray member comprising an upwardly-extending sleeve portion of substantially the same diametrical size as that of said cylindrical sleeve member, said cylindrical sleeve member and said upwardly-extending sleeve member being provided along their outer peripheries with a plurality of complemental saw-teeth equal in number to said plurality of pairs of water and food bowls.

7. An automatic cat or dog feeder as defined in claim 6 wherein said rotative tray member and said tray member cover plate are integrally formed of a synthetic plastic material.

8. An automatic cat or dog feeder as defined in claim 7 wherein said means for periodically rotating said rotative tray member with respect to said tray member cover plate comprises an electric drive motor, an energization circuit for said drive motor, a time switch in said energization circuit and switch means in said energization circuit and controlled by the rotative limit positions of said rotative tray member in its periodic movement for de-energizing said motor.

* * * * *